ND STATES PATENT

[19] United States Patent
Zerlauth

[11] 4,279,424
[45] Jul. 21, 1981

[54] SEALING ARRANGEMENT FOR A JOINT BETWEEN TWO STATOR PARTS OF A TURBOMACHINE

[75] Inventor: Ferdinand Zerlauth, Andelfingen, Switzerland

[73] Assignee: Sulzer Brothers Limited, Winterthur, Switzerland

[21] Appl. No.: 84,892

[22] Filed: Oct. 15, 1979

[30] Foreign Application Priority Data

Oct. 26, 1978 [CH] Switzerland ................. 11068/78

[51] Int. Cl.³ .................................... F16J 15/34
[52] U.S. Cl. ..................................... 277/83; 277/84; 277/120; 277/141; 277/155; 277/157; 277/195; 415/173 R
[58] Field of Search ................. 277/83, 84, 119–122, 277/138, 141, 144, 145, 151, 155, 157, 170–176, 190, 191, 193, 195, 216; 415/170 R, 173 R, 173 A

[56] References Cited

U.S. PATENT DOCUMENTS

| 1,020,456 | 3/1912 | Simon ............................ 277/120 |
| 1,811,012 | 6/1931 | Hodge ........................ 277/145 X |
| 1,821,862 | 9/1931 | Wilson ........................ 277/170 X |
| 3,752,598 | 8/1973 | Bowers et al. ............... 415/173 R |
| 4,212,474 | 7/1980 | Arai ................................ 277/83 |

FOREIGN PATENT DOCUMENTS 859346 12/1952 Fed. Rep. of Germany ......... 277/119
188327 3/1923 United Kingdom ................. 277/141

Primary Examiner—Robert S. Ward, Jr.
Attorney, Agent, or Firm—Kenyon & Kenyon

[57] ABSTRACT

The sealing arrangement for sealing the gap between two relatively movable stator parts includes a split ring which is adapted to twist and expand within a V-shaped notch formed by the two parts. The ring is held in place by a coil spring and the split in the ring is bridged and sealed by a locking member which allows the ring to expand and contract radially.

8 Claims, 5 Drawing Figures

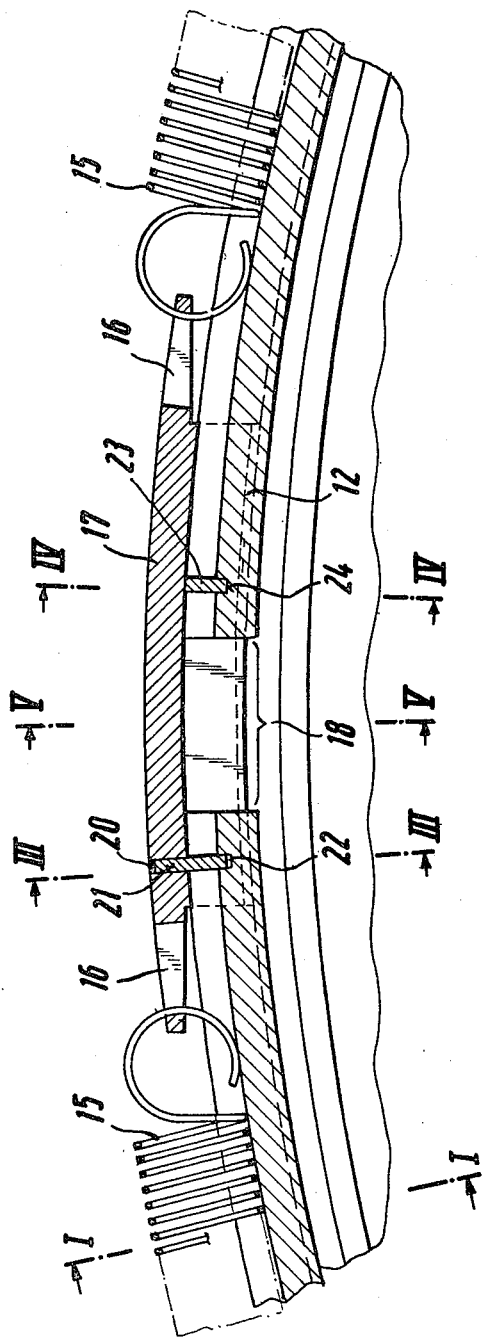
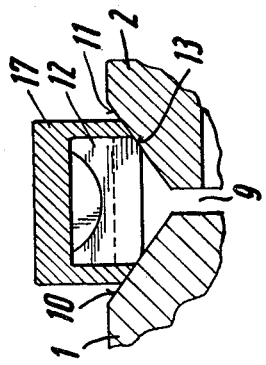

SEALING ARRANGEMENT FOR A JOINT BETWEEN TWO STATOR PARTS OF A TURBOMACHINE

This invention relates to a seal. More particularly, this invention relates to a sealing arrangement for sealing a joint between two stator parts of a turbo-machine.

As is known, an annular gap is generally present between relatively movable stator parts of a turbo-machine and must be sealed in order to prevent loss of any medium flowing through the inside of the machine or to prevent undesirable penetration of a gaseous medium which frequently surrounds the parts, for example an uncontrolled entry of cooling air between a guide blade carrier and a flow duct surface of a gas turbine. During operation of the machine, this annular gap may become wider or narrower due to the axial displacements of the two stator parts within certain limits. The parts may also expand and contract radially and these contractions or expansions of the peripheries of the two stator parts may differ from one another. Further, the axes of the two parts may become offset from one another or tilt in relation to one another. In such cases, the annular gap becomes wider in one zone along the periphery and narrower in a diametrically opposite zone.

Because the temperatures of the stator parts or the surroundings may be very high in many cases, it becomes impossible to use elastomeric sealing materials to seal the gaps between the parts.

Accordingly, it is an object of the invention to provide the simplest possible seal for a gap between two stator parts which is temperature-resistant and remains operative during relative movements between the stator parts.

It is another object of the invention to provide a sealing arrangement for a gap between the two stator parts of a turbine machine which is of relatively simple construction.

Briefly, the invention is directed to a sealing arrangement for use with a pair of stator parts of a turbomachine wherein the parts are disposed in spaced coaxial relation to each other to define a gap therebetween. In accordance with the invention, each stator part is provided with a bevelled peripheral surface at an end facing the other part in order to define a V-shaped notch. In addition, a split ring is disposed about the ends of the stator parts to seal the gap and has a pair of bevelled sealing surfaces each of which slidably contacts a bevelled peripheral surface of a respective stator part in sealed relation. Also, a tensioning means is disposed on the split ring to hold the ring on the ends of the stator parts while biasing the ring into a closed condition.

Sealing adequate for the turbomachine is obtained by using relatively fine lathe steel for forming the relatively smooth surfaces of the sealing surfaces of the split ring and the bevelled surfaces of the stator parts. The leakage which was found to occur in a test rig was extremely small.

By varying the penetration of the split ring into the V-shaped notch, the ring is able to follow any differences in the distances between the two stator parts axially while the split allows the rings to expand and contract radially. The use of steel to produce the split ring gives the necessary temperature resistance and, in combination with the split, also enables the ring to twist relatively easily so that the ring can also take uneven changes in the annular gap.

The tensioning means can be in the form of a coil spring so as to hold the split ring in permanent contact with the bevelled peripheral surfaces of the stator parts.

When used to seal a gap between a guide blade carrier and a flow duct of a gas turbine, the coil spring is required only at standstill and at starting up of the machine. This is because, during operation, the ring is pressed into the notch by the cooling air which is at a positive pressure in relation to the combustion gases in the blade duct.

The required sealing of the split in the ring can be provided by a locking member which allows changes in the ring periphery. In this regard, the locking member may be disposed in a sealed bridging relation over the ring ends while being movable relative to one of the ends to permit the ring to expand and contract.

These and other objects and advantages of the invention will become more apparent from the following detailed description taken in conjunction with the accompanying drawings wherein:

FIG. 2 illustrates a sectional view taken on line II—II of FIG. 1;

FIG. 5 illustrates a view taken on line V—V of FIG. 2.

Figure 1:
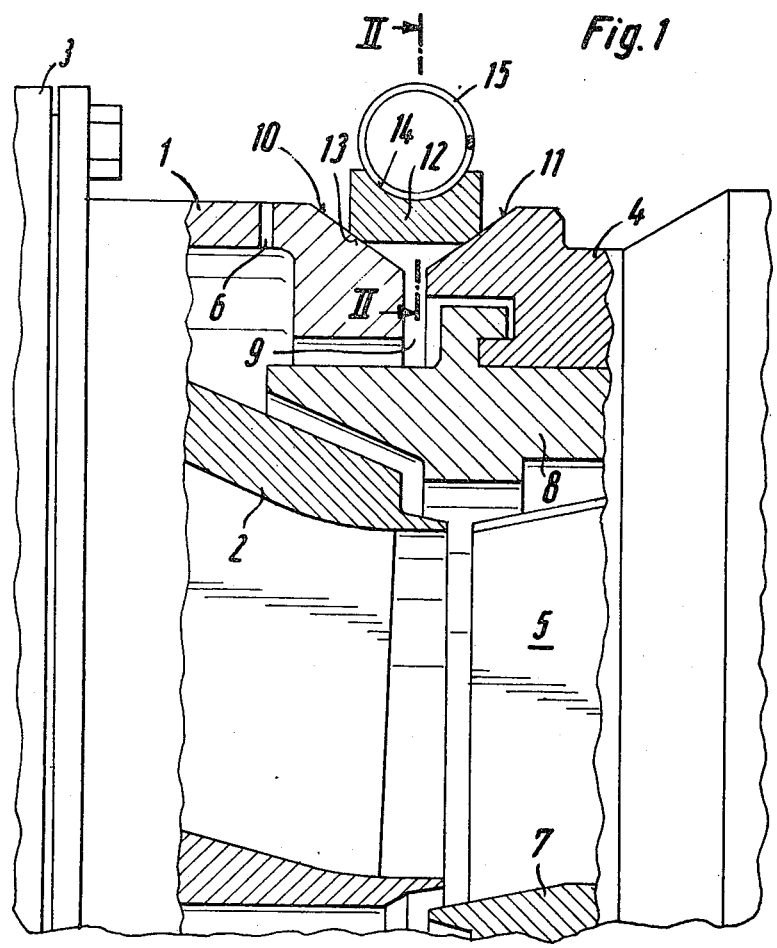
FIG. 1 illustrates a cross-sectional view taken on line I—I of a sealing arrangement according to the invention.
Figure 3:
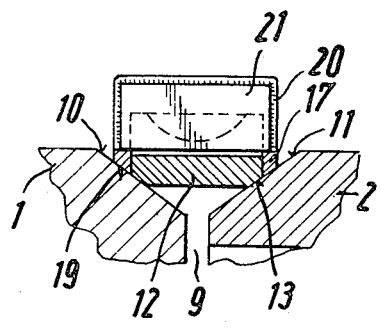
FIG. 3 illustrates a view taken on line III—III of a locking member used in the sealing arrangement in accordance with the invention.

Referring to FIG. 1, a turbomachine in the form of a gas turbine has a centering housing 1 which bears on a guide blade ring 2 so to be movable under the action of heat. This housing 1 merges on the left, as viewed, into a cooling jacket 3 of a combustion chamber (not shown). A plurality of boreholes 6 are provided over the periphery of the housing 1 to permit a defined quantity of cooling air to enter the housing 1. The gas turbine also has a carrier housing 4 with an end face in plane parallel relationship to the end face of the housing 1. The housing 4 is also concentrically in alignment with the centering housing 1 in an ideal position. The housing 4 encompasses a plurality of blades 5 of a rotor 7 of the gas turbine and carries heat shielding segments 8 which form a radial closure of a flow duct for hot combustion gases flowing through the trubine. The housing 4 has a part situated farther downstream (not shown) to act as a carrier for the guide blades of other turbine stages (not shown).

As shown in FIG. 1, the pair of stator parts, i.e. the housings 1, 4, are disposed in spaced coaxial relation to each other to define an annular gap 9 therebetween. Due to the construction of the gas turbine, the housings 1, 4 are movable relative to one another. Hence, the annular gap 9 must be sealed. To this end, each housing 1, 4 is provided with a bevelled peripheral surface at the end facing the other housing 1, 4. These bevelled surfaces define a V-shaped notch which slopes towards the gap 9 as well as sealing surfaces 10, 11, respectively. In addition, a split ring 12 of rectangular cross-section is disposed about the housings 1, 4 in order to seal the gap 9. This ring 12 has a pair of bevelled sealing surfaces 13 which slidably contact the surfaces 10, 11 of the housings 1, 4 in sealed relation and, as shown in FIG. 2, is split along the periphery at a point 18.

The ring 12 is held on the sealing surfaces, 10, 11 by a tensioning means in the form of a coil spring 15. To this end, the ring 12 is provided with a fillet 14 and the spring 15 is disposed within the fillet 14 to clamp the ring 12 on the housings 1, 4 while biasing the ring 12 into a closed condition. The purpose of the spring 15 is to hold the split ring 12 in the V-shaped notch at standstill and at starting up of the gas turbine. During operation, this function is carried out by the cooling air which is at a positive pressure with respect to the interior of the housings 1, 4.

The sealing ring 12 is made, for example, from a steel having suitable material properties with respect to temperature resistance and torsion properties.

Referring to FIG. 2, a locking member 17 is disposed in sealed bridging relation over the ends of the ring 12 to close the ring 12 in the region of the split 18 and, at the same time, seal the split with respect to the exterior. As shown, the locking member 17 is secured to eyelets 16 on the opposite ends of the coil spring 15 and is of hood-shaped cross-section (FIG. 5) to bridge the ring ends. The locking member 17 has a pair of bevelled end surfaces 19 on limbs which bear on the peripheral surfaces 10, 11 of the housings 1, 4 in adjoining relation to the peripheral surfaces 13 of the sealing ring 12.

Figure 4:
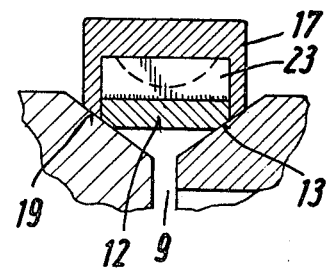
FIG. 4 illustrates a view taken on line IV—IV of FIG. 2.

The locking member 17 is movable relative to one of the ends of the sealing ring 12 in order to permit the ring 12 to expand and contract. In order to accommodate this movement while sealing the locking member 17 relative to the ring 12, a sealing plate 21 is engaged in a groove 20 in the locking member 17 and a corresponding recess 22 in the sealing ring 12 near one end. The sealing plate 21 forms a seal for the split 18 and the fillet on the left hand side, as viewed in FIG. 2, of the split 18. In addition, a second sealing plate 23 is engaged in a groove 24 in the sealing ring 12 and slidably contacts the locking member 17 to seal the fillet 14 adjacent the opposite side of the split 18. As shown in FIG. 4, the plate 23 is flush with the outer periphery of the ring 12 so that the base surface of the hood-shaped cross-section of the locking member 17 bears on the plate 23 but the locking member 17 and the ring 12 still remain movable relative to one another on those sides. Thus, the sealed ring 12 can yield to any "breathing" of the housings 1, 4.

Referring to FIG. 1, the sealing ring 12 which is of substantially rectangular cross-section is capable of twisting about a longitudinal axis thereof. To this end, the ring is made of steel so as to be resiliently distortable.

It is to be noted that the sealing arrangement is not restricted to the illustrated embodiment relative to the material of the sealing ring or the use of a tensioning means. For example, the sealing ring 12 may be replaced, for example, by a longitudinally elastic element, such as an elastomer. In this case, the coil spring 15 may be eliminated in some cases.

What is claimed is:

1. In combination,
    a pair of stator parts of a turbomachine, said parts being disposed in spaced coaxial relation to each other to define a gap therebetween, each said part having a bevelled peripheral surface at an end facing the other of said parts to define a V-shaped notch;
    a split ring disposed about said ends of said stator parts to seal said gap, said ring having a pair of bevelled sealing surfaces and being unrestrainedly put on the bevelled surfaces parts from outside, each said sealing surface slidably contacting said peripheral surface of a respective stator part in sealed relation; and
    a tensioning means disposed on said ring to hold said ring on said ends of said stator parts while biasing said ring into a closed condition.

2. The combination as set forth in claim 1 wherein said ring has a pair of opposed ends disposed in spaced facing relation within said notch and said tensioning means is a spring disposed peripherally about said ring.

3. The combination as set forth in claim 2 which further comprises a locking member securing opposite ends of said spring together, said locking member being disposed in sealed bridging relation over said ring ends, said locking member being movable relative to one of said ring ends to permit said ring to expand and contract.

4. The combination as set forth in claim 3 wherein said locking member is of hood-shaped cross-section bridging said ring ends having bevelled end surfaces bearing on said peripheral surfaces of said stator parts.

5. The combination as set forth in claim 1 wherein said ring is capable of elastically bending out of its plane along its circumference.

6. The combination as set forth in claim 5 wherein said ring is made of steel.

7. The combination as set forth in claim 1 wherein said ring has a fillet longitudinally of an outer surface thereof and said tensioning means is a coil spring received in said fillet, and which further comprises a locking member secured at opposite ends to respective ends of said tensioning means.

8. The combination as set forth in claim 7 which further comprises a first sealing plate engaged in said ring and said locking member to seal said fillet adjacent one end of said ring and a second sealing plate engaged in said ring and slidably contacting said locking member to seal said fillet adjacent an opposite end.

* * * * *

UNITED STATES PATENT AND TRADEMARK OFFICE
CERTIFICATE OF CORRECTION

PATENT NO. : 4,279,424

DATED : July 21, 1981

INVENTOR(S) : Ferdinand Zerlauth

It is certified that error appears in the above—identified patent and that said Letters Patent is hereby corrected as shown below:

Column 3, lines 33 to 34, after "the fillet" insert --14--

Column 4, line 15, after "surfaces" insert --of said--

Signed and Sealed this

Seventeenth Day of November 1981

[SEAL]

Attest:

GERALD J. MOSSINGHOFF

Attesting Officer    Commissioner of Patents and Trademarks